United States Patent [19]

Chaplin

[11] 4,156,475
[45] May 29, 1979

[54] AIR CUSHION VEHICLE PROPULSION SYSTEM

[75] Inventor: John B. Chaplin, Covington, La.

[73] Assignee: Textron Inc., Providence, R.I.

[21] Appl. No.: 781,512

[22] Filed: Mar. 25, 1977

[51] Int. Cl.² ............................................. B60V 1/14
[52] U.S. Cl. ................................... 180/117; 244/12.5
[58] Field of Search ....................... 180/116, 117, 118; 244/12.4, 12.5, 12.6

[56] References Cited

U.S. PATENT DOCUMENTS

| | | | |
|---|---|---|---|
| 2,948,111 | 8/1960 | Nelson | 244/34 A |
| 3,331,462 | 7/1967 | Wernicke | 180/116 X |
| 3,398,809 | 8/1968 | Wood | 180/120 X |
| 3,524,611 | 8/1970 | Frank | 244/12.4 X |
| 3,605,672 | 9/1971 | Strumbos | 114/166 |
| 3,827,527 | 8/1974 | Bertelsen | 180/120 |

*Primary Examiner*—John P. Silverstrim
*Attorney, Agent, or Firm*—Bean, Kauffman & Bean

[57] ABSTRACT

A rapidly reversible air propeller shroud system is provided for operating an air cushion vehicle more efficiently both in forward and reverse direction travel and maneuvering modes. The shroud includes a sectionally rigid portion of aerodynamically efficient form for operating the vehicle in one direction of travel; and in combination therewith an otherwise inoperative inflatable collar which may be rapidly inflated to expand so as to modify the aerodynamic characteristics of the shroud for operation of the propeller efficiently in reverse direction thrust mode.

7 Claims, 8 Drawing Figures

PRIOR ART – FORWARD PROPULSION
EFFICIENT AIR FLOW
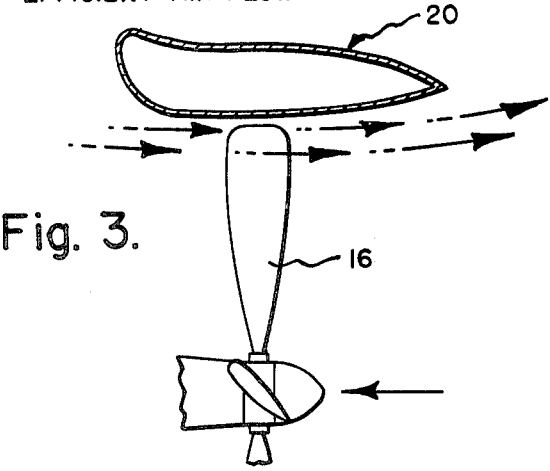
Fig. 3.
PRIOR ART – REVERSE PROPULSION
AIR-FLOW SEPARATION – LOW EFFICIENCY
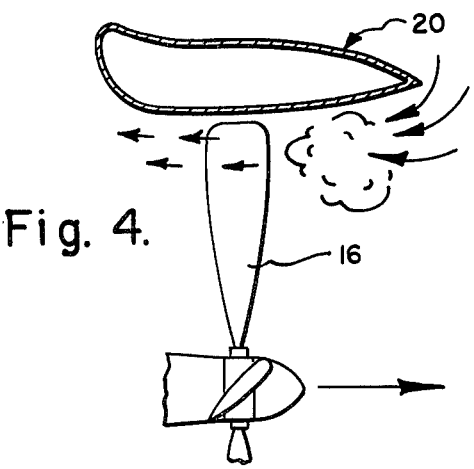
Fig. 4.
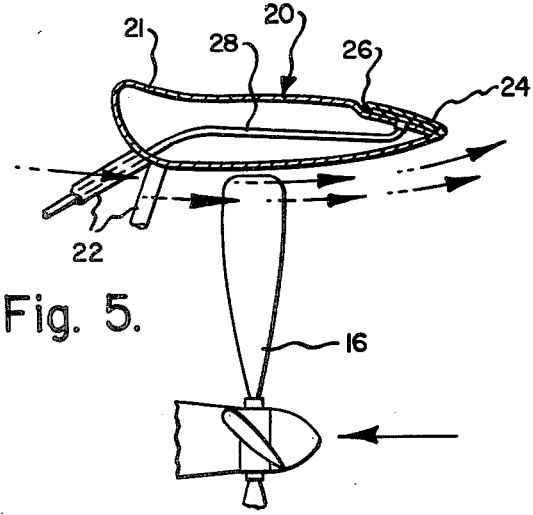
Fig. 5.
THIS INVENTION – FORWARD PROPULSION
EFFICIENT AIR FLOW
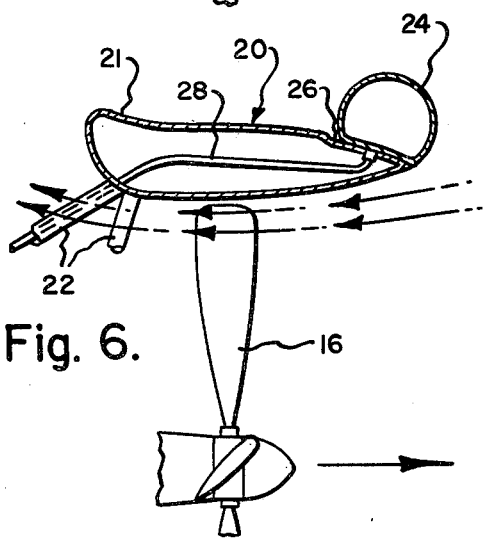
Fig. 6.
THIS INVENTION – REVERSE PROPULSION
NO AIR FLOW SEPARATION
HIGH EFFICIENCY
Fig. 7.
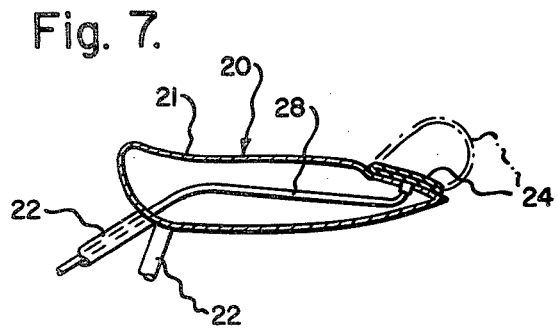
Fig. 8.
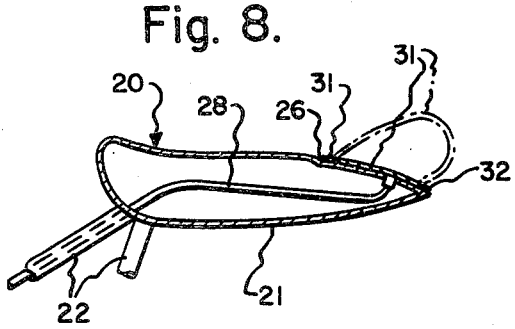

AIR CUSHION VEHICLE PROPULSION SYSTEM

BACKGROUND OF THE INVENTION

When the conventionally shrouded air propeller, such as in an air cushion vehicle, is operating to drive the vehicle forwardly, the air moves through and around the shroud in aerodynamically efficient manner; the relatively blunt sectional form at the leading edge of the shroud preventing "separation" of the incoming air flow. However, upon reverse operation of the propeller the air drawn in through the rear ends of prior type shrouds "separates" as it passes through the relatively sharply sectioned trailing edge portion of the shroud, thereby substantially reducing or perhaps nullifying the effective operation of the propeller.

Air cushion or surface effect type vehicles are typically driven by ducted air propellers as illustrated for example in known U.S. Pat. Nos. 3,241,627; 3,261,420; 3,306,387; 3,331,462; 3,478,836; 3,583,520; 3,608,662; and 3,608,663. The ducts shown therein for shrouding the propellers are designed to provide optimum forward thrust performances, but when such propellers are "reversed" they provide extremely poor reverse thrust effects. Hence, such vehicles are notoriously sluggish in forward motion braking; reverse direction propulsion; as well as variable directional motion control maneuverings, such as are critically important to military and docking operation, and the like.

BRIEF SUMMARY OF THE INVENTION

In the case of the present invention, incidental to "reversal" of the propeller operation an inflatable collar circumscribing at least a substantial part of the trailing edge of the shroud is activated so as to modify the shape of the reverse flow inlet end of the shroud to prevent "separation" of the incoming air stream as it passes through the propeller thrust duct. The collar is inflated by means of compressed air (or other fluid pressure) taken from any suitable supply, either automatically (incidental to either reversal of the propeller "pitch" or its direction of rotation) or under selective manual control by the vehicle operator. Thus, when the vehicle is in forward motion the duct of the present invention performs in accord with its "normal" sectional configuration to provide maximum propeller forward thrust efficiency; but when the propeller operation is reversed and the collar inflated the reverse thrust effect of the propeller is also optimized. Hence, optimum forward/braking/reverse speed and maneuverability operations of the vehicle are realized.

By way of example the invention is illustrated by the accompanying drawing wherein:

THE DRAWING

FIG. 3 is a fragmentary view corresponding to a portion of FIG. 2 but showing a conventional type shroud operating efficiently in its forward thrust configuration;

FIG. 4 is a view corresponding to FIG. 3 but showing the shroud operating inefficiently in reverse thrust mode;

FIG. 5 is a view corresponding to FIG. 3 but of a shroud of the present invention which also operates efficiently in forward thrust mode;

FIG. 6 is a view corresponding to FIG. 5 but illustrates how the propeller operates efficiently in reverse thrust mode when enclosed by a shroud in accordance with the present invention; and FIGS. 7-8 are views corresponding to FIGS. 5, 6, showing modified forms of inflatable shroud collar devices such as may be employed for the purposes of the invention.

DETAILED DESCRIPTION OF PREFERRED EMBODIMENTS

Figure 1:
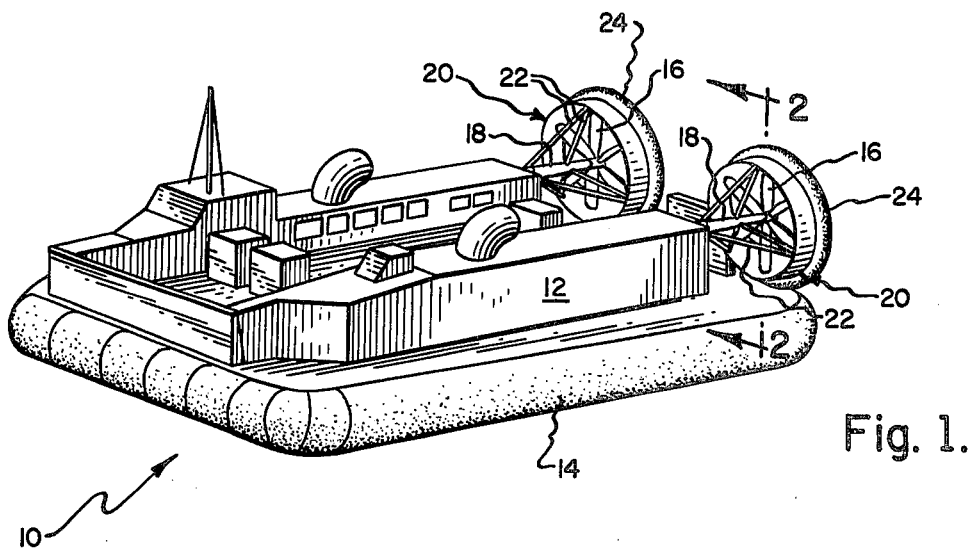
FIG. 1 is a perspective view of a typical air cushion type vehicle equipped with a pair of propulsion air propellers enclosed by shrouds of the present invention.
Figure 2:
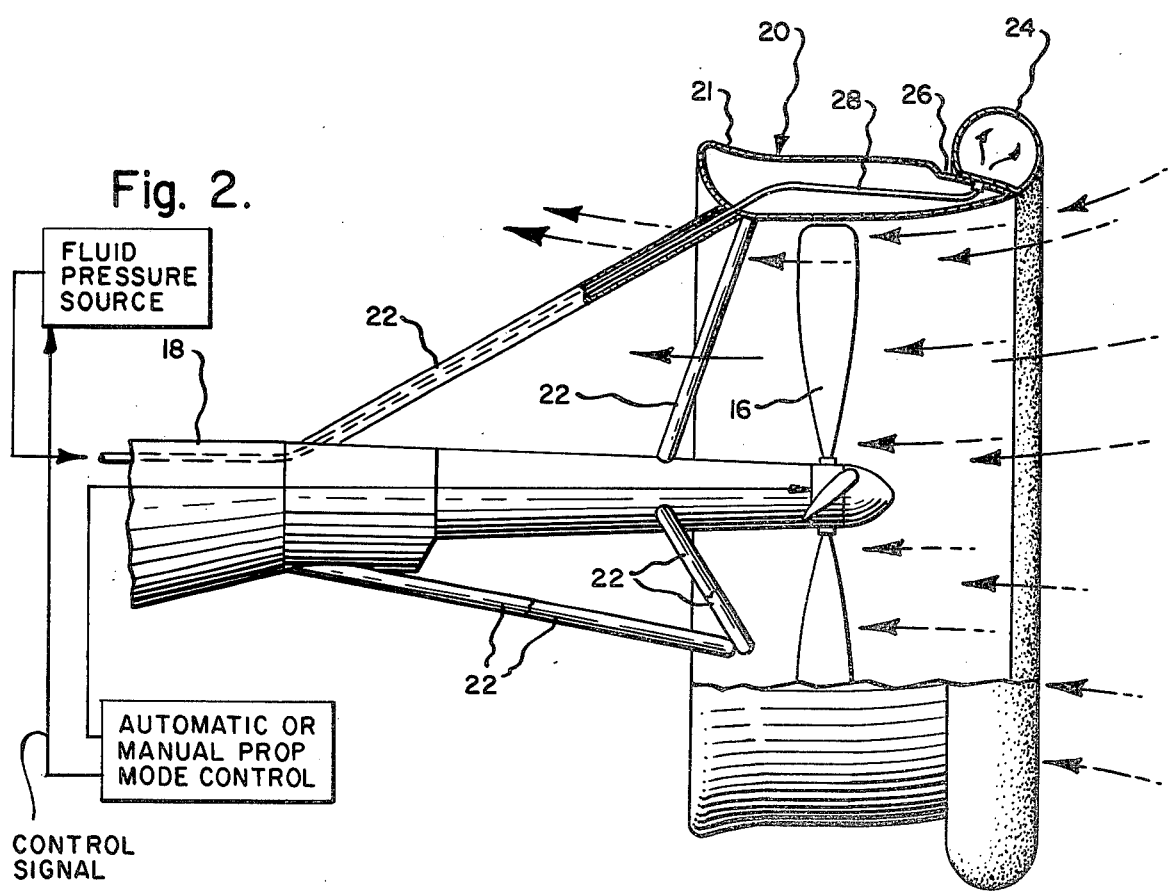
FIG. 2 is an enlarged scale fragmentary parti-elevational and sectional view of one of the vehicle's propulsion propellers and of its shroud and drive shaft nacelle; the shroud and propeller being illustrated in their reverse thrust operating mode.

As shown herein by way of example at FIGS. 1, 2, the invention is embodied in an air cushion supported vehicle designated generally at 10, comprising a main platform structure 12; a depending air cushion seal 14; and a pair of reversible operation propulsion propellers 16—16 carried at the stern of the machine. Such propellers are typically driven by engines carried within the main structure 12 by propellers shafts extending through support booms as shown at 18—18.

In the case of the present invention the propellers are enclosed within specially configured shroud systems designated generally at 20—20 which include shells 21—21 mounted on the booms by means of struts 22 so as to provide open ducts in which the propellers operate. The rigid portions of the shroud shells are substantially conventionally sectionally profiled so that the propellers may drive the craft forwardly with aerodynamic efficiency; being characterized by having bluntly profiled foward or leading edges while being relatively sharply edge at their rear ends. However, in the case of the present invention an expandable/retractable collar as shown at 24 encompasses the outer peripheral surface of the trailing edge portion of each shroud. The latter may perhaps be recessed as illustrated at 26 (FIG. 2) to accommodate the collar when contracted so as to present a smooth line continuation flow path for air thereover.

As shown herein at FIGS. 2, 5, 6, 7, the collar device may be fabricated in the form of a flexible tube so as to be adapted to lie flatwise when deflated against the trailing edge of the shroud as shown at FIG. 5, while being inflatable such as into the form shown at FIG. 6 Inflation/deflation control of the collar may be effected through means of a fluid transmission conduit 28 coupling the collar to either a pneumatic or hydraulic pressure source, such as any suitable bleed-off from the vehicle power plant. Preferably the conduit 28 will be housed inside of one of the struts supporting the shroud and thence interiorly of the boom into operative connection with a pressure control device, actuation of which will be further described hereinafter.

A primary object of the present invention is to improve the travel control characteristics of the air cushion type vehicle in reverse direction mode operations; it being known that the conventionally shrouded propeller system as illustrated for example at FIGS. 3, 4, is notoriously inefficient when pulling the craft rearwardly. As illustrated at FIG. 3, the conventionally shrouded system is efficient when operating to drive the craft forwardly; the shroud being sectionally profiled in accordance with aerodynamic engineering principles to provide smooth line air flow through and around the shroud. However, this shroud system is notoriously ineffective (if not a hindrance) when the propeller is operating in reverse mode as illustrated at FIG. 4. In such case the shroud is operationally in effect reversely disposed relative to the propeller in contradiction to its "normal" efficiency; because the shroud then presents its thin edge to the oncoming air stream thereby causing the latter to undesirably "separate" as it enters the duct, as is illustrated at FIG. 4.

As distinguished from the referenced prior art the shroud system of the present invention not only operates with maximum efficiency when driving the craft forwardly as shown at FIG. 5; but also operates with greatly improved efficiency when pulling the craft rearwardly, as shown at FIG. 6. Whereas the shroud sectional profile of the invention is identical to that of the prior art when operating normally, when in reverse mode operation it presents to the oncoming air stream a blunt leading edge configuration which operates to avoid undesirable "separation" of the air stream. Thus, the reverse mode maneuverability as well as forward motion braking capability of the craft is greatly improved, which is so important for example in connection with docking or military maneuvers and the like.

The sectional configuration of the inflated collar device 24 may be designed and controlled in accordance with aerodynamic preferences by suitably fabricating the collar forming material. For example, it may be preferred that when the collar is inflated it will assume a sectional profile more of the nature of the configurations shown at FIGS. 7, 8, compared to the configuration shown at FIGS. 2 and 6. Or, control of the inflated sectional configuration may be effected by fabricating the collar of sheet material wherein different portions thereof are of different elasticity characteristics. Alternatively, shape-controlling non-elastic strands may be employed for such purposes, either externally or internally of the collar forming material.

By way of further example FIG. 8 illustrates another suitable form of collar which comprises simply a ribbon-like sheet of flexible material 30, cemented or otherwise attached along its opposite side edges to the cowl structure, as indicated at 31, 32. Thus, when inflated the ribbon will assume a sectional configuration such as is shown by the broken lines at FIG. 8 to provide the improved operational performance of the invention.

It will be readily understood that the supply/retraction of pressuring fluid to the interior of the collar device through the conduit 28 may be valve-controlled either manually by the pilot of the craft; or alternatively automatically incidental to reversal of the propeller system by means of any suitable control interconnection, whereby whenever the propeller directional thrust pilot-control is actuated the shroud(s) will be automatically profile-adjusted to provide for most efficient operation of the craft in either direction of travel.

I claim:

1. In combination, in an air cushion supported vehicle, a vehicle propulsion air propeller shroud system and a reversible thrust propeller enclosed within the duct provided thereby;
    said system including a rigidly structured shell which is directionally fixed relative to said vehicle and which is sectionally profiled to provide efficient air flow in conjunction therewith when said propeller is operating in vehicle forward thrust mode, whereby said shell is rigidly, and relatively bluntly sectionally profiled at its forward thrust mode leading air intake end and is relatively sharp-edged sectionally profiled at its forward thrust mode trailing air discharge end;
    an expandable/contractable collar device mounted upon said shell so as to encompass at least a substantial portion of the outer peripheral surface of said trailing discharge end of said shell;
    means for alternately controlling said propeller to operate in vehicle forward and reverse thrust modes; and
    means for alternately expanding and contracting said collar device, whereby to alternately provide for efficient operation of said propeller in vehicle forward and in reverse direction modes and whereby said collar, when expanded, cooperates with said shell structure to provide a propeller shroud which is sectionally blunt-profiled at both opposite ends when said propeller is operating in reverse mode.

2. The combination as set forth in claim 1 wherein said collar comprises a flexible tube-like fabrication.

3. The combination as set forth in claim 1 wherein said collar comprises a ribbon-like member affixed along its opposite side edge portions to said shell.

4. An air cushion support vehicle having a reversibly-operable propulsion air propeller, a shroud encompassing said propeller to provide an air duct therethrough, said shroud including a rigidly structured shell portion which is directionally fixed relative to said vehicle and which is sectionally profiled with a rigidly formed blunt air intake forward thrust mode leading end and a relatively pointed forward thrust mode air discharge end to provide efficient air flow in conjunction with said propeller when operating in vehicle forward thrust mode, said shell portion having an expandable/contractable collar device encompassing said forward thrust mode air discharge end for converting said shroud to cooperate with said propeller when reversed to provide said shroud with sectionally blunt profiles at both ends for propeller operation of increased efficiency, when in its reverse thrust mode.

5. An air cushion supported vehicle as set forth in claim 4 wherein the interior of said collar is coupled in communication with a fluid pressure source.

6. An air cushion supported vehicle as set forth in claim 5 wherein control of fluid pressure communication between said collar and said fluid pressure source is manually actuated.

7. An air cushion supported vehicle as set forth in claim 5 wherein control of fluid pressure communication between said collar and said fluid pressure source is automatically actuated in conjunction with reversals of the propeller operation.

* * * * *